United States Patent Office 3,794,647
Patented Feb. 26, 1974

3,794,647
PROCESS FOR PURIFYING LACTAMS
Ruthild Henn, Domat-Ems, and Hans-Joachim Schultze and Clau Berther, Chur, Grisons, Switzerland, assignors to Inventa AG fur Forschung und Patentverwertung, Zurich, Switzerland
No Drawing. Filed Sept. 22, 1971, Ser. No. 182,830
Claims priority, application Switzerland, Oct. 1, 1970, 14,550/70
Int. Cl. C07d 41/06
U.S. Cl. 260—239.3 A
18 Claims

ABSTRACT OF THE DISCLOSURE

A process for the purification of lactams by extraction wherein the lactam is treated in the crystalline state with a solvent capable of dissolving the impurities selectively.

A large number of processes for removing impurities from caprolactam are known. Extractive processes are moreover frequently described in which both aqueous lactam solutions are extracted with organic solvents and solutions of lactam in organic solvents are extracted with water. In consequence of the high solubility of caprolactam in the majority of common solvents, however, such extractions either show very heavy losses or, if the yield is favorable, they are not particularly effective because of inadequate selectivity. Liquid-to-liquid extractions, moreover, require heavy expenditure on apparatus and high energy outputs, in particular when aqueous phases must be evaporated. Moreover, the purifying effect is generally inadequate, so that a combination with other methods, such as ion exchange, or treatment with adsorption agents or chemical agents, is unavoidable.

It has been found that with lactams, an excellent purifying effect is obtained in a simple manner when the lactam, e.g. caprolactam, is treated in the crystalline state with a solvent which is capable of dissolving the impurities selectively and has no dissolving power, or only a slight dissolving power for caprolactam. This is all the more surprising as the impurities consist of compounds which are chemically close to latcam, in particular methyl lactams and aliphatic acid amides, and furthermore the extractive treatment of concentrated aqueous caprolactam solution, for example 90% lactam and 10% water, does not have a comparable purifying action. Cyclohexane is used with advantage as solvent, this having only a slight dissolving power e.g. for caprolactam. Other cycloaliphatic or aliphatic hydrocarbons may also be used, however. Suitable in particular are methycyclopentane, methycyclohexane and straight-chained or branched aliuhatic hydrocarbons in the range of $C_5$–$C_{10}$, such as n-hexane and petroleum ether.

The lactam is either introduced into the solvent in the solid state—in the form of crystals or flakes—or else distributed in the solvent as a lactam melt while stirring and with simultaneous cooling so that crystallization takes place, the desired purifying effect occuring at the same time. The lactam:solvent ration is in particular at least 1:1, but is advantageously 1:1.5 to 1:4 (parts by weight), the upper limit being determined by the consumption of solvent. It is also possible to carry out several washing operations in succession, and re-use the solutions from the after-washes, as a result of which the consumption of solvent is considerably reduced.

The temperatures at which the purification is carried out lie below the melting point of the lactam and are e.g. 10 to 45 C°., advantageously 10 to 30° C. After a time of action of e.g. 5 to 60 minutes, preferably 10 to 30 minutes, the separation of the lactam from the solvent is effected e.g. by filtration or centrifuging. The lactam thereafter still contains about 10% of solvent, which can be removed from the melt by vacuum drying or, if distillation is subsequently carried out, with the aid of a stream of inert gas.

The dried product is finely crystalline and, compared to the starting material, shows substantially better analysis data. The improvement applies not only to the permanganate number and the proportion of "volatile bases," but also in particular to the gas chromatogram and the UV spectrum of the purified lactam sample, i.e. the impurities visible in the gas chromatogram decrease considerably and the light transmittance values at characteristic wave lengths undergo an increase. In the case of the lauric lactam e.g. especially a striking improvement of the gas chromatogram, of the content of ketone and the APHA-number is obtained.

The process is specially suitable for purifying lactam residues in which a particularly high concentration of impurities has been reached as a result of preceding enrichment methods, such as, for instance, melt crystallization. Such crystallization mother liquors cannot be brought to usable quality by simple distillation, whereas a preliminary treatment by the process according to the invention supplies a high-grade lactam once more. Of course, the process can also be applied to convert already pre-purified lactams into products of the highest purity, so that they satisfy the present high quality demands made by polyamide manufacturers.

The process according to the present invention for purifying lactams having 6–12 C-atoms in the ring, is therefore characterized in that the lactams are extracted in a crystalline state with the aid of aliphatic and cycloaliphatic hydrocarbons having 5–12 C-atoms, which have no dissolving power or only a slight dissolving power for lactams. For this purpose especially unsubstituted cycloalkanes with 5–6 C-atoms, the alkyl derivatives thereof with altogether 10 C-atoms at the most, straight-chained and branched aliphatic hydrocarbons with 5–10 C-atoms a petroleum ether are useful.

EXAMPLE 1

200 g. of flaked caprolactam with a permanganate number 100 and "volatile bases" 1.3 were stirred in 400 ml. of cyclohexane for 30 minutes at room temperature. The washed lactam was filtered off and treated once more with 400 ml. of cyclohexane.

Yield: 186.6 g.=93.3%
Vacuum distillation over 0.18% NaOH gave a lactam with a permanganate number 12,500 and volatile bases 0.19
Light transmittance: $LT_{290}$=88.5%, $LT_{310}$=94.5%

By comparison, the starting material could only be improved a little by vacuum distillation over 0.18% NaOH:

Permanganate number 4,300, volatile bases 0.75
Light transmittance: $LT_{290}$=34.5%, $LT_{310}$=65%

EXAMPLE 2

200 g. of caprolactam of the above quality were melted and introduced into 300 ml. of cyclohexane while stirring, the addition being so controlled by cooling that the temperature did not rise above 20° C. When all the lactam had crystallized out, the solvent was separated by filtration.

Yield: 196.2 g.=98.1%.

Vacuum distillation over 0.18% NaOH gave a lactam with a permanganate number 18,000 and volatile bases 0.13.

Light transmittance: $LT_{290}$=86.0%, $LT_{310}$=94.5%

EXAMPLE 3

The temperature during the crystallization was kept at 45° C., but in other respects the same procedure as in Example 2 was followed.

Yield: 194.6 g.=97.3%

Vacuum distillation over 0.18% NaOH gave a lactam with a permanganate number 20,000 and volatile bases 0.14.

Light transmittance: $LT_{290}$=77.5%, $LT_{310}$=89%

EXAMPLE 4

Example 3 was modified to the extent that the caprolactam:cyclohexane ratio was 1:2.

Yield: 192.4 g.=96.2%

Vacuum distillation over 0.18% NaOH gave a lactam with a permanganate number 18,000 and volatile bases 0.21.

Light transmittance: $LT_{290}$=89%, $LT_{310}$=95.5%

EXAMPLE 5

200 g. of anhydrous "extract lactam" (permanganate number 200, volatile bases 0.35, light transmittance LT 290/310=22.0/43.0%), as obtained after the neutralization and extraction of the product of the Beckmann rearrangement of cyclohexane oxime with sulphuric acid, were introduced in the molten state into 400 ml. of cyclohexane while stirring intensively. The temperature was kept at 20° C. during the introduction (about 5 minutes) and thereafter for a further 30 minutes. The crystal sludge was thereupon filtered with suction.

Yield: 196.6 g.=98.3%
Permanganate number: 850, volatile bases 0.2
Light transmittance: $LT_{290}$=33.0%, $LT_{310}$=47.5%

Vacuum distillation over 0.18% NaOH without removing any first runnings gave a lactam with a permanganate number 28,000, volatile bases 0.03.

Light transmittance: $LT_{290}$=94.5%, $LT_{310}$=97.0%

EXAMPLE 6

200 g. of "extract lactam" (permanganate number 200, volatile bases 0.34) were distilled with the addition of 0.18% NaOH (no first runnings, 3.2% residue).

Yield: 193.6 g., corresponding to 96.8% of the theoretical
Permanganate number: 3,600, volatile bases 0.13
Light transmittance: $LT_{290}$=69.0%, $LT_{310}$=89.5%

The liquid distilled lactam was thereafter introduced into 400 ml. of cyclohexane at 20° C. and kept at this temperature for 30 minutes while stirring. The lactam crystals were thereafter filtered off from the cyclohexane with suction.

Yield: 190.9 g.
Permanganate number: 20,000, volatile bases 0.04
Light transmittance: $LT_{290}$=96.5%, $LT_{310}$=98.5%

EXAMPLE 7

200 g. of a heavily contaminated caprolactam (permanganate number 80, volatile bases 1.62, light transmittance $LT_{290/310}$=0%) were introduced in the form of flakes into 400 ml. of n-hexane at 20° C., the mixture was well stirred for 30 minutes and filtering with suction was thereafter carried out.

Yield: 198.6 g.=99.3% of the theoretical.
Permanganate number: 400, volatile bases 0.51
Light transmittance: $LT_{290}$=22.5%, $LT_{310}$=38.5%

Vacuum distillation over 0.18% NaOH gave the following product.

Permanganate number: 16,000, volatile bases 0.23
Light transmittance: $LT_{290}$=84.5%, $LT_{310}$=92.0%

EXAMPLE 8

200 g. of a highly contaminated caprolactam (permanganate number <50, volatile bases 1.69) obtained as a residue in another purifying operation were so introduced in molten form into 400 ml. of methylcyclohexane while stirring extensively that the temperature of the mixture did not rise above 25° C. The crystal sludge formed was kept at 15–20° C. for 30 minutes and thereafter worked up by filtering with suction.

Yield: 196.1 g.=98%
Permanganate number: 600, volatile bases 0.38
Light transmittance: $LT_{290}$=26%, $LT_{310}$=40.5%

Vacuum distillation over 0.18% NaOH without taking a low-boiling fraction gave a product with Permanganate number 20,000, volatile bases 0.42
Light transmittance: $LT_{290}$=89%, $LT_{310}$=93%
Yield: 192.9 g.

EXAMPLE 9

100 g. of pulverized lauric lactam (content of ketone 775 p.p.m., APHA 50 and content of oxime 5 p.p.m.) were stirred in 400 ml. of cyclohexane for 30 minutes at room temperature. The filtered and dried lactam shows the following analysis data:

Content of ketone: 385 p.p.m.
APHA: 35
Content of oxime: <5 p.p.m.
Yield: 99.3%

EXAMPLE 10

Example 9 was altered inasmuch as petroleum ether (boiling point 110–140° C.) was used for the purification. A product was obtained with:

Content of ketone: 183 p.p.m.
APHA: 35
Content of oxime: 5 p.p.m.
Yield: 99.4%

What we claim is:
1. A process for the removal of impurities from lactams having 6 to 12 carbon atoms in the ring comprising extracting said impurities with a solvent taken from the class consisting of aliphatic and cycloaliphatic hydrocarbons having 5 to 12 carbon atoms and petroleum ether, for 5 to 60 minutes at a temperature below the melting point of said lactams, the weight ratio of lactam to solvent being at least 1 to 1, said impurities comprising C-methyl lactams and aliphatic acid amides.

2. A process according to claim 1 wherein said solvents are unsubstituted cycloalkanes having 5 to 6 carbon atoms; alkyl derivatives of said cycloalkanes having a total of up to 10 carbon atoms; straight or branched chain aliphatic hydrocarbons having 5 to 10 carbon atoms; or petroleum ether.

3. A process according to claim 1 wherein said temperature is 10° to 45° C.

4. A process according to claim 3 wherein said temperature is 10° to 30° C.

5. A process according to claim 1 wherein said period is 10 to 30 minutes.

6. A process for the extraction of impurities from lactam having 6 to 12 carbon atoms in the ring comprising treating said lactams in a crystalline state for 5 to 60 minutes with an aliphatic or cycloaliphatic hydrocarbon having 5 to 12 carbon atoms or with petroleum ether, the weight ratio of said lactam to said solvent being at least 1 to 1.

7. A process as recited in claim 1 wherein the solvent is methyl-cyclopentane or methycyclohexane.

8. A process as recited in claim 1 wherein the aliphatic hydrocarbon has 5–10 C-atoms.

9. A process as recited in claim 1 wherein the solvent is n-hexane or petroleum ether.

10. A process as recited in claim 1 wherein the lactam is introduced into the solvent in the solid state.

11. A process as recited in claim 1 wherein the lactam is introduced into the solvent as a lactam melt while stirring with simultaneous cooling whereby crystallization takes place.

12. A process as recited in claim 1 wherein the weight ratio of lactam to solvent is from 1:1 to 1:4.

13. A process as recited in claim 1 wherein the weight ratio of lactam to solvent is from 1:1.5 to 1:4.

14. A process as recited in claim 1 wherein the extraction time is 5–60 minutes.

15. A process as recited in claim 1 wherein the extraction time is 10–30 minutes.

16. A process as recited in claim 1 wherein the lactam is extracted at 10–45° C.

17. A process as recited in claim 1 wherein the lactam is extracted at 10–30° C.

18. A process as recited in claim 1 wherein the lactam is caprolactam.

References Cited
UNITED STATES PATENTS 2,758,941   8/1956   Kretzers et al. ____ 260—239.3 A HENRY R. JILES, Primary Examiner R. T. BOND, Assistant Examiner